(12) United States Patent
Bensmann

(10) Patent No.: US 11,292,615 B2
(45) Date of Patent: Apr. 5, 2022

(54) DEFORMATION SENSING SYSTEM

(71) Applicant: Airbus Operations GmbH, Hamburg (DE)

(72) Inventor: Stefan Bensmann, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 415 days.

(21) Appl. No.: 16/552,127

(22) Filed: Aug. 27, 2019

(65) Prior Publication Data

US 2020/0071003 A1 Mar. 5, 2020

(30) Foreign Application Priority Data

Aug. 31, 2018 (GB) ...................................... 1814241

(51) Int. Cl.
*B64F 5/60* (2017.01)
*G01B 21/32* (2006.01)

(52) U.S. Cl.
CPC ................ *B64F 5/60* (2017.01); *G01B 21/32* (2013.01)

(58) Field of Classification Search
CPC .................................. B64F 5/60; G01B 21/32
See application file for complete search history.

(56) References Cited

U.S. PATENT DOCUMENTS

| 9,776,731 | B1 * | 10/2017 | Lieberman | ............. | B64D 45/00 |
| 2012/0002038 | A1 | 1/2012 | Furrer et al. | | |
| 2013/0213141 | A1 | 8/2013 | Park | | |
| 2016/0363648 | A1 | 12/2016 | Mindell et al. | | |
| 2016/0363659 | A1 | 12/2016 | Mindell et al. | | |
| 2016/0363663 | A1 | 12/2016 | Mindell et al. | | |
| 2016/0363664 | A1 | 12/2016 | Mindell et al. | | |
| 2017/0179602 | A1 | 6/2017 | Charvat et al. | | |
| 2018/0099761 | A1 | 4/2018 | Griffiths et al. | | |
| 2018/0335015 | A1 | 11/2018 | Zhang et al. | | |

FOREIGN PATENT DOCUMENTS

| BR | 102015012962 A2 * | 1/2016 | ............... G01S 7/40 |
| CA | 2001488 A1 * | 4/1990 | ........... G01S 13/935 |
| EP | 3301397 A1 | 4/2018 | |
| WO | 2017081230 A1 | 5/2017 | |

OTHER PUBLICATIONS

United Kingdom Search Report; priority document.

* cited by examiner

*Primary Examiner* — Jamel E Williams
(74) *Attorney, Agent, or Firm* — Greer, Burns & Crain, Ltd.

(57) ABSTRACT

An aircraft structural deformation sensor system comprises a deformation sensor arrangement comprising one or more transceiver(s), each transceiver matched to at least one corresponding transponder and configured to be attached to a support component. The deformation sensing arrangement is configured such that one or more range values between the at least one transceiver and the at least one corresponding transponder is determinable by the transceiver. A deformation controller is configured to process the one or more range values from the transceiver(s) and compute a deformation state of the deformable component relative to the support component.

9 Claims, 3 Drawing Sheets

DEFORMATION SENSING SYSTEM

CROSS-REFERENCES TO RELATED APPLICATIONS

This application claims the benefit of the United Kingdom patent application No. 1814241.4 filed on Aug. 31, 2018, the entire disclosures of which are incorporated herein by way of reference.

FIELD OF THE INVENTION

The present technology relates to an aircraft deformation sensing system, and an aircraft comprising such a system.

BACKGROUND OF THE INVENTION

An aircraft usually comprises a plurality of deformable components that are rigidly connected to a support component. It is known to measure the deformation of the deformable components during flight test or certification using deformation sensing systems such as mechanical strain gauges or optical measurement techniques. As these systems are used as a temporary measure to achieve certification or test objectives, the increased weight, installation time, operability and cost of the systems are not considered. An improved deformation sensing system according to embodiments of the present technology is proposed.

SUMMARY OF THE INVENTION

Advantages of the present technology will now become apparent from the detailed description with appropriate reference to the accompanying drawings.

An embodiment of the present technology provides an aircraft structural deformation sensor system comprising a deformation sensor arrangement comprising one or more transceiver(s), each transceiver matched to at least one corresponding transponder and configured to be attached to a support component, wherein the deformation sensing arrangement is configured such that one or more range values between the at least one transceiver and the at least one corresponding transponder is determinable by the transceiver; and, a deformation controller configured to process the one or more range values from the transceiver(s) and compute a deformation state of the deformable component relative to the support component.

In a further embodiment of the present technology, an aircraft structural deformation sensor system is provided wherein the deformable component is a wing and the support component is a fuselage.

Another embodiment of the present technology provides an aircraft structural deformation sensor system comprising a plurality of transponders arranged spanwise along a single spanwise station and at least one chordwise station.

A further embodiment of the present technology provides an aircraft structural deformation sensor system wherein the spanwise station intersects the quarter chord station.

In a further embodiment of the present technology, an aircraft structural deformation sensor system is provided comprising arrays of transponders arranged spanwise along a plurality of spanwise stations and at least one chordwise station.

Another embodiment of the present technology provides an aircraft structural deformation sensor wherein spanwise stations intersect at least one chordwise station at 25%, 50% and 75% of the chordwise station length, respectively.

A further embodiment of the present technology provides an aircraft structural deformation sensor system comprising a plurality of chordwise stations that intersect the spanwise stations at equal intervals along the total length of the spanwise stations.

In a further embodiment of the present technology, an aircraft structural deformation sensor system is provided further configured to connect to a flight control computer.

Finally, another embodiment of the present technology provides an aircraft comprising an aircraft structural deformation sensor system.

BRIEF DESCRIPTION OF THE DRAWINGS

Embodiments of the technology will now be described, by way of example only, with reference to the following drawings in which.

DETAILED DESCRIPTION OF THE PREFERRED EMBODIMENTS

Figure 1:
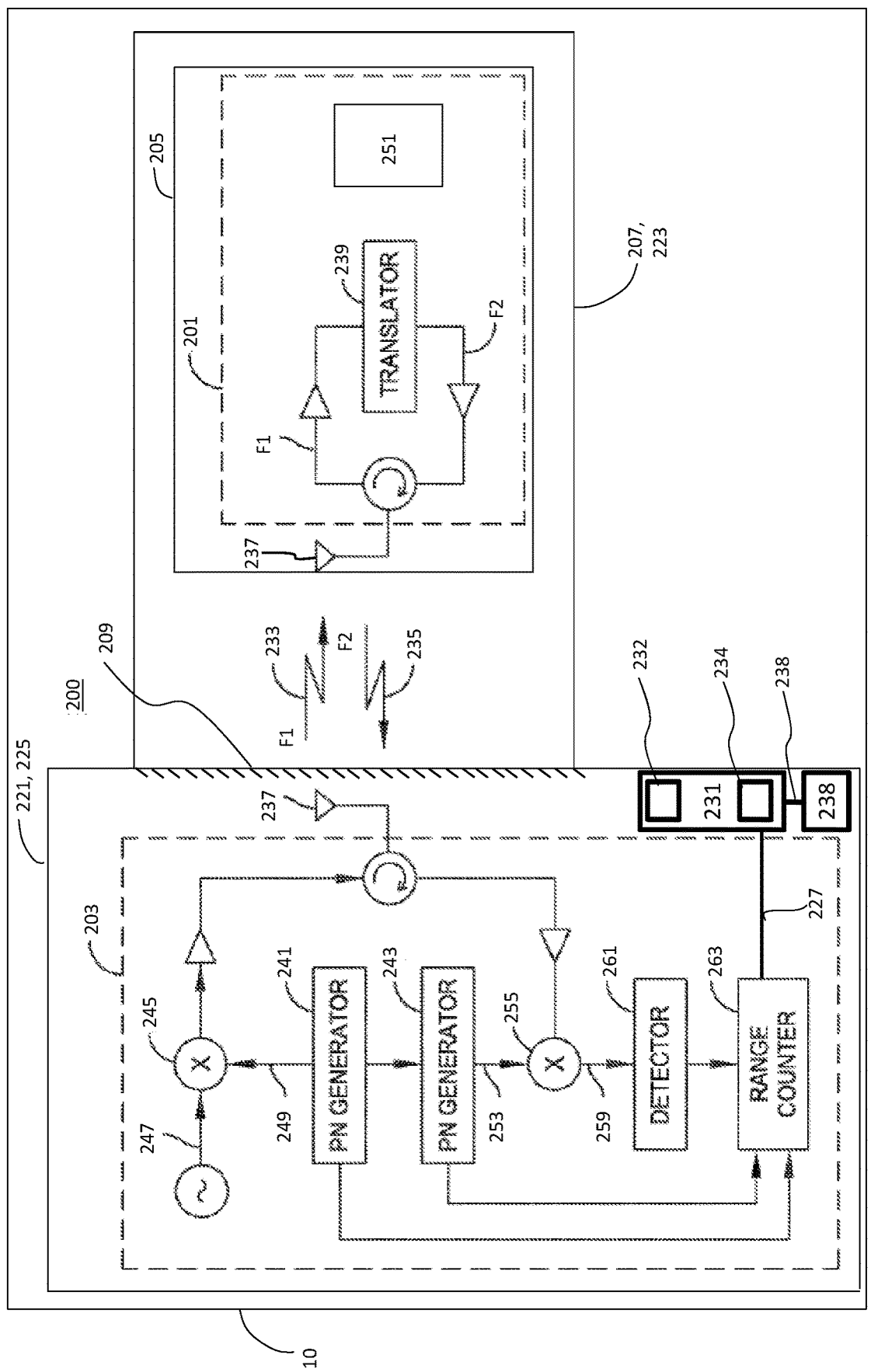
FIG. 1 is a schematic overview of an aircraft structural deformation sensing system 200 according to exemplary embodiments of the present technology.

With reference to FIG. 1, an aircraft structural deformation sensor system 200 according to an embodiment of the present technology is shown. The deformation sensor system 200 comprises a time-of-flight (TOF) sensor subsystem arrangement comprising a transmitter (in the form of a transponder 201) configured to be attached to a deformable component 207, matched to a corresponding receiver (in the form of a transceiver 203) configured to be attached to a support component 221, and a deformation controller 231 that is configured to process one or more output range values from the transceiver 203.

The transceiver 203 is a device comprising both a transmitter and a receiver that share common circuitry. The transmitter is a transmit-only electronic device that produces electromagnetic signals through an antenna 237. The receiver is an electronic receive-only device that receives electromagnetic signals through an antenna 237 and converts the information carried by them to a usable form. The transponder 201 is a device that emits a signal in response to receiving an interrogating signal identifying the transponder 201.

In the present embodiment shown, the transceiver 203 is connected, via an input lead 227, to a deformation computer 231. The deformation computer 231 comprises a storage medium 232, a processor 234, and optionally an output lead 236 connected to a flight control computer 238.

The deformation sensor system 200 uses modulation ranging of pulsed direct sequence spread spectrum (DSSS) signals 233 to determine an output range value at a given instant of the transponder 201 from the transceiver 203 and hence the output range value of a known position on the deformable component 207 from a known position on the support component 221.

During operation of the structural deformation sensing system 200, coded modulation of the transmitted signal 233 and demodulation of a received and re-transmitted signal 235 is done by phase shift modulating a carrier signal. A transmitter portion of the transceiver 203 transmits via an antenna 237 a pseudo-noise code-modulated signal 233 having a frequency F1. The transponder 201 receives the transmitted signal 233 having frequency F1, which is fed to and translated by a translator 239 to a different frequency F2 and is retransmitted by the transponder 201 as the received and re-transmitted signal 235 that is code-modulated having frequency F2. A receiver subsystem (not shown) of the transceiver 203, which is co-located with the transmitter portion of the transceiver 203, receives the retransmitted signal 235 and synchronizes to the return signal. By measuring the time delay between the transmitted signal 233 being transmitted and received signal 235, the receiver sub system determines the two-way propagation time delay value to the transponder 205, from which an output range value is determinable. The time delay corresponds to the two-way propagation delay of the transmitted 233 and retransmitted signals 235.

The structural deformation sensing system 200 of the present embodiment comprises two, separate, first and second pseudo-noise (PN) code generators 241, 243 for the transmitter and receiver subsystems of the transceiver 203, so that the code at the receiver portion of the transceiver can be out of phase with the transmitted code or so that the codes can be different.

The transmitter portion of the transceiver 203 for measuring TOF distance of an electromagnetic signal comprises the first pseudo noise generator 241 for generating a first phase shift signal, a first mixer 245 which receives a carrier signal 247, which modulates the carrier signal with a first phase shift signal 249 to provide a pseudo-noise code modulated signal 233 having a center-frequency F1 that is transmitted by the transceiver 203.

The transponder 201 comprises a power source 251 and the translator 239 which receives the pseudo noise code-modulated signal 233 having center-frequency F1 and translates the pseudo-noise code-modulated signal of frequency F1 to provide a translated pseudo-noise code modulated signal having a center frequency F2 or that provides a different coded signal centered at the center frequency F1, and that is transmitted by the transponder back to the transceiver 203.

The transceiver 203 further comprises the second pseudo noise generator 243 for generating a second phase shift signal 253, and a second mixer 255 which receives the second phase shift signal 253 from the second pseudo-noise generator 243, which receives the translated pseudo-noise code-modulated signal 235 at frequency F2 and modulates the pseudo-correlated code-modulated signal 235 having a center-frequency F2 with the second phase shift signal 253 to provide a return signal 259.

The transceiver 203 further comprises a detector 261 which detects the return signal 259, and a ranging device/counter 263 that measures the time delay between the transmitted signal 233 and the received signal 235 to determine the round trip range from the transceiver 203 to the transponder 201 and back to the transceiver 203.

The transponder 201 comprises a protective housing 205 to protect the circuitry and is attached to a deformable component 207 at a known structural position on the deformable component 207. The deformable component 207 is rigidly connected to a support component 221 at a first joint 209. In the exemplary FIG. 2, the deformable component 207 may be represented as a wing 223 that is rigidly connected to a fuselage 225 at the joint 209, however it may alternatively be a winglet 226 rigidly connected to a wing 223, or a vertical tail 228 rigidly connected to a fuselage 225, etc.

During operation of the aircraft 10, the deformable component 207 will deform relative to the support component 221. The first joint location 209 in the example shown is a point of negligible or zero deformation of the deformable component 207. The type of deformation of the deformable component 207 that is rigidly connected to the support component 221, and its scale, will vary during operation of the aircraft 10. For example, bending deformation of the deformable component 207 relative to the support component 221 may occur, which, in the example of a wing 223, will occur due to air pressure loads, fuel loads and/or inertia loads acting upon the wing 223 and causing it to bend relative to the joint 209 and fuselage 223. Torsional deformation may occur for the same reasons, either independently or in combination with other forms of deformation, such as bending. The scale of the deformation will also vary when depending on the point of measurement of the deformation on the deformable component 207 relative to the point of negligible or zero deformation of the deformable component 207.

The transceiver 203 comprising a protective housing 219 is attached to a corresponding support component 221 at a known structural position on the support component 207.

At a given instant, the output range value from the deformation sensor system 200 may be converted to a corresponding actual position value of the deformable component 207 by the deformation computer 231 using the following exemplary process. The output value of the deformation sensor system 200 is received by the processor 234 of the computer 231 via the input lead 227. The processor 234 is configured to compute an actual position value of the deformable component 207 relative to the support component 221 by comparing the output value from the deformation sensor system 200 against a set of predetermined output values stored on the storage medium 232 that are matched with a corresponding actual position values. The actual position value may then be stored in the storage medium 236 for further reference or be diverted back to the processor 234 for further processing.

Storage on the storage medium may be preferable for a number of further operational uses. For example, fatigue loading may vary according to how the aircraft is operated and therefore extension of the aircraft 10 fatigue life may be enabled using this stored data. The stored data may therefore be extracted and used at a point in time to determine the loading experienced by parts in the region of the transponder 201. This may be advantageous to validate assumed fatigue loading used in fatigue lifecycle calculations to certify the parts or to calculate the remaining fatigue life of the parts based on actual fatigue loading experienced in service. In a further example, the peak allowable loading experienced by the deformable component or parts of it, may be exceeded in rare circumstances during the operation of aircraft 10. The stored data may be extracted and used at a point in time to determine the loads experienced by specific parts in the region of the transponder 201. This may be advantageous to assess whether certain maintenance tasks such as repair or inspection need to be carried out or waived.

Further processing of the actual position value by the processor 234 may be preferable for a number of other operational uses. For example, the processor 234 may be further configured to compare the actual position value of the deformable component 207 against an envelope of allowable threshold values of deformation and to signal to the flight control computer 238 when an unallowable threshold deformation value is recorded. In such a condition, the flight control computer 238 may be configured to activate load alleviation measures, such as automatic deployment of load alleviation control surfaces, automatic reduction of the aircraft angle of attack and/or speed. In a further example, the processor 234 may be further configured to calculate a difference value between actual position values from a pair of deformable components 207. The pair of deformable components 207 may be a left hand wing 223 and an opposite right hand wing 223 that are both rigidly connected to the fuselage 225, when the aircraft 10 is in a stable flight condition, i.e., 1G cruise conditions. The processor may be further configured to compare the calculated difference value to an allowable threshold difference value and to signal to the flight control computer 238 when an unallowable difference value is recorded. In such a condition, the flight control computer 238 may be configured to activate an aircraft trim command to counteract the difference in deformation between the pair of components 207. This may, for example, involve the transfer of fuel from the more deformed wing 223 to the less deformed wing 223.

It should be appreciated that the frequency of the above processes for the deformation sensor system 200 depends on the intervals deemed acceptable for the control and monitoring of the specific deformable component 207 and may depend on the condition of the aircraft 10 at the given instant.

Figure 2:
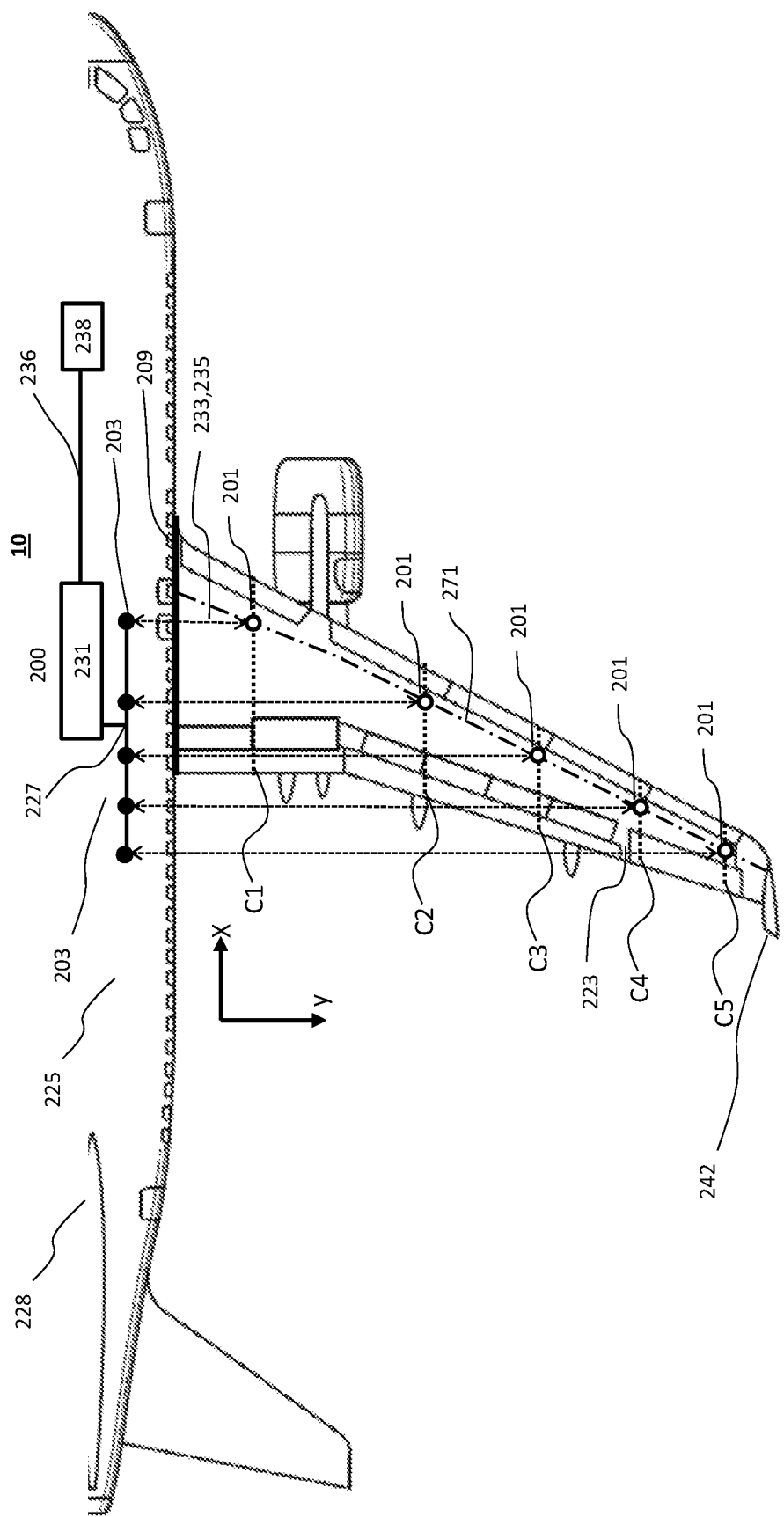
FIG. 2 is an schematic plan view of an aircraft with a structural deformation sensing system 200 according to a further exemplary embodiment of the present technology.

With reference to FIG. 2, an aircraft comprising a further embodiment of the present technology is shown configured and optimized for measuring bending deformation of the wing 223 along the wing 223 in a spanwise direction, i.e., in the +/−Y direction shown. The deformation sensor system 200 comprises a single array of transceivers 203 and a corresponding array of transponders 201. Each transceiver 203 in the array is connected via an input lead 227 to the deformation computer 231 and each transceiver 203 is further configured to signal a single corresponding transponder 201. Each corresponding transponder 201 in the array of transponders 201 is located at a unique, separate position, falling on both a given chordwise station C1, C2, C3, C4 or C5 and spanwise station 271 along the wing 223. In the embodiment shown, the spanwise station 271 intersects at each chordwise station C1 to C5 at 25% of the chordwise stations' length. Similarly, each chordwise station C1 to C5 intersects the spanwise station 271 at equal intervals along it's total length measured in the spanwise direction +/−Y from the joint 209 to the outermost extremity of the wing 223. For clarity, the chordwise direction means extending in the +/−X direction, which is sometimes referred to as the streamwise direction. In the present example, the chordwise percentage is 25%, (known as the quarter chord station) which is typically the position of the aerodynamic center where the least amount of torsion deformation occurs when the wing 223 is subjected to air pressure loading. During operation of the aircraft 10, the wing 223 will deform Similar to previously mentioned embodiments, the output range value from the deformation sensor system 200 for each transponder 201 at a known spanwise position is converted to a corresponding actual position value of each transponder 201 by the deformation computer 231 using the previously mentioned process. The actual position values may then be stored in the storage medium 236 and used comparatively to determine the bending deformation condition of the wing 223 at given intervals and may be used further for the exemplary uses mentioned in previous embodiments.

It should be appreciated that the embodiment of FIG. 2 is equally applicable to other combinations of deformable component 207 and support components 221, for example, the tail 228 and fuselage 225, winglet 242 and wing 223, etc.

Figure 3:
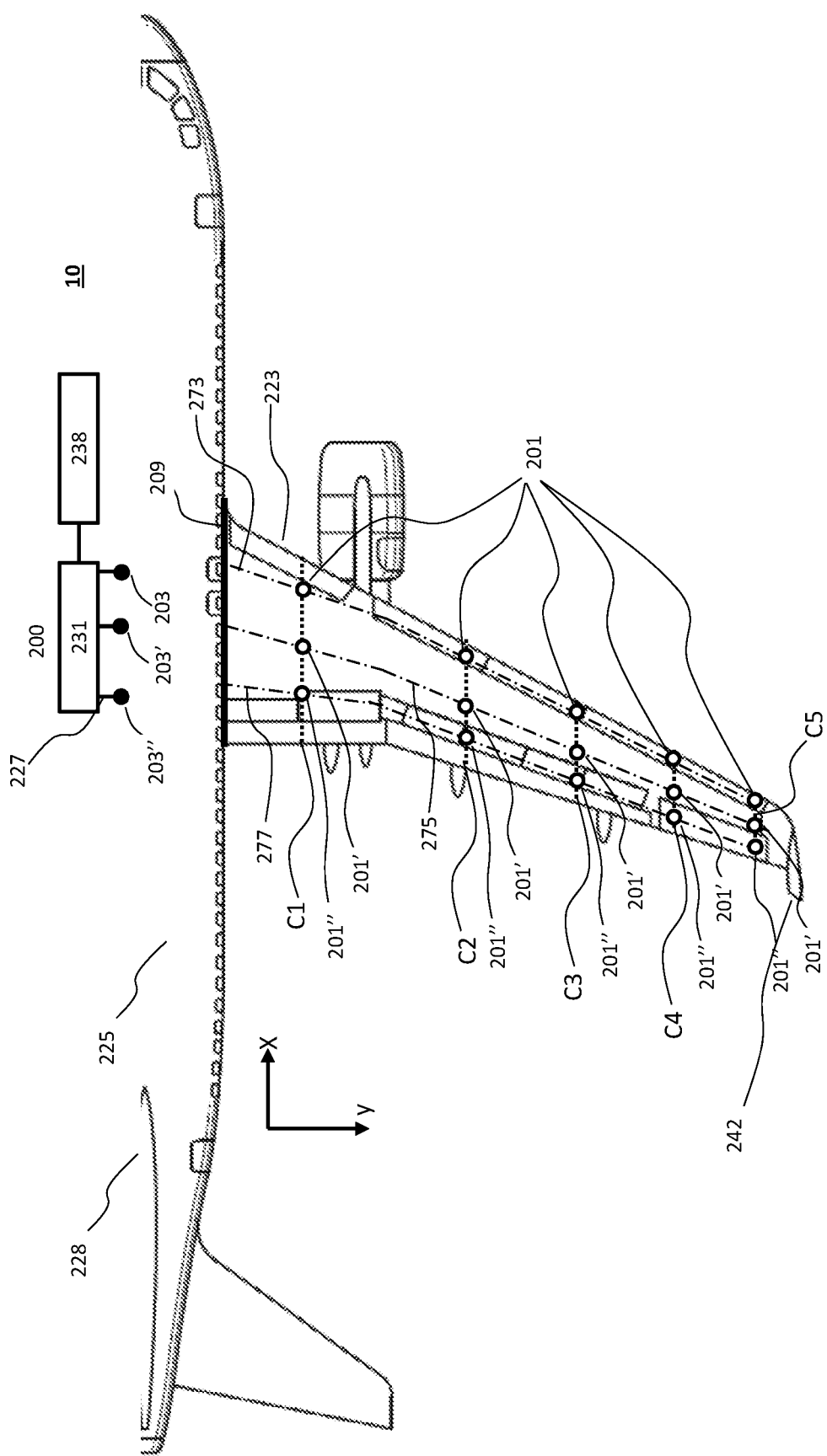
FIG. 3 is an schematic plan view of an aircraft with a structural deformation sensing system 200 according to yet a further exemplary embodiment of the present technology.

With reference to FIG. 3 an aircraft 10 comprising a further embodiment of the present technology is shown configured and optimized for measuring twist and bending of the wing 223 in a spanwise direction, i.e., in the +/−Y direction and in a chordwise direction −/+X, as shown. The deformation sensor system 200 comprises three separate arrays of transceivers 203, 203', 203", and their corresponding array of transponders 201, 201' and 201", respectively. Each transceiver 203, 203', 203" is connected via an input lead 227 to the deformation computer 231. Unlike the embodiment of FIG. 2, each transceiver 203, 203', 203" is configured to signal a plurality (in this case five) of transponders 201, 201', 201" of the corresponding transponder array. So for example, transceiver 203" exchanges a plurality of signals with five transponders labelled 201" of FIG. 3 in order to determine a plurality of output range values at a given instant from these transponders 201" which are then processed by the deformation controller 231, in the same way as previously mentioned embodiments.

Each corresponding transponder 201 is located at a unique, separate position, falling on both a given chordwise station C1, C2, C3, C4 or C5 and spanwise station 273 along the wing 223, whereby in the present embodiment, the spanwise station 273 intersects at each chordwise station C1 to C5 at 25% of the chordwise stations' length. Furthermore, each corresponding transponder 201' is further located at a unique, separate position, falling on both a given chordwise station C1, C2, C3, C4 or C5 and spanwise station 275 along the wing 223, whereby in the present embodiment, the spanwise station 275 intersects at each chordwise station C1 to C5 at 50% of the chordwise stations' length. Further still, each corresponding transponder 201" is further located at a unique, separate position, falling on both a given chordwise station C1, C2, C3, C4 or C5 and spanwise station 277 along the wing 223, whereby in the present embodiment, the spanwise station 277 intersects at each chordwise station C1 to C5 at 75% of the chordwise stations' length.

Similarly, each chordwise station C1 to C5 intersects the spanwise stations 273, 275, 277 at equal intervals along their total length measured in the spanwise direction +/−Y from the joint 209 to the outermost extremity of the wing 223. For clarity, the chordwise direction means extending in the +/−X direction, which is sometimes referred to as the streamwise direction.

During operation of the aircraft 10, the wing 223 will deform, and again, similar to previously mentioned embodiments, the output range value from the deformation sensor system 200 for each transponder 201, 201', and 201" at known spanwise positions is converted to corresponding actual position value of each transponder by the deformation computer 231 using the previously mentioned process. The actual position values may then be stored in the storage medium 236 and used comparatively to determine the bending and twist deformation condition of the wing 223 at given intervals and may be used further for the exemplary uses mentioned in previous embodiments.

It should be appreciated that the embodiment of FIG. 3 is equally applicable to other combinations of deformable component 207 and support components 221, for example, the tail 228 and fuselage 225, winglet 242 and wing 223, etc.

Where in the foregoing description, integers or elements are mentioned which have known, obvious or foreseeable equivalents; then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft structural deformation sensor system comprising:
   a deformation sensor arrangement comprising one or more transceivers,
      each transceiver matched to at least one corresponding transponder and configured to be attached to a support component,
   wherein the deformation sensor arrangement is configured such that one or more range values between the one or more transceivers and the at least one corresponding transponder is determinable by the transceiver; and,
   a deformation controller configured to process the one or more range values from the one or more transceivers and compute a deformation state of a deformable component relative to the support component.

2. An aircraft structural deformation sensor system according to claim 1 wherein the deformable component is a wing and the support component is a fuselage.

3. An aircraft structural deformation sensor system according to claim 2, comprising a plurality of transponders arranged spanwise along a single spanwise station and at least one chordwise station.

4. An aircraft structural deformation sensor system according to claim 3, wherein the spanwise station intersects a quarter chord station.

5. An aircraft structural deformation sensor system according to claim 2 comprising arrays of transponders arranged spanwise along a plurality of spanwise stations and at least one chordwise station.

6. An aircraft structural deformation sensor system according to claim 5, wherein spanwise stations intersect at least one chordwise station at 25%, 50% and 75% of a chordwise station length, respectively.

7. An aircraft structural deformation sensor system according to claim 4, comprising arrays of transponders arranged spanwise along a plurality of spanwise stations and at least one chordwise station and comprising a plurality of chordwise stations that intersect the spanwise stations at equal intervals along a total length of the spanwise stations.

8. An aircraft structural deformation sensor system according to claim 1 further configured to connect to a flight control computer.

9. An aircraft comprising an aircraft structural deformation sensor system according to claim 1.

* * * * *